United States Patent
Jones et al.

[11] Patent Number: 5,833,893
[45] Date of Patent: Nov. 10, 1998

[54] METHODS OF MAKING DIFFERENT ADDITIVE-CONTAINING FILAMENTS

[75] Inventors: Frank R. Jones, Asheville; Stanley A. McIntosh, Candler; Gary W. Shore, Asheville; Karl H. Buchanan; David B. Ledford, both of Arden; Wayne S. Stanko, Asheville; G. Daniel Gasperson, Candler; Charles F. Helms, Jr., Asheville, all of N.C.

[73] Assignee: BASF Corporation, Mt. Olive, N.J.

[21] Appl. No.: 811,061

[22] Filed: Mar. 3, 1997

Related U.S. Application Data

[60] Provisional application No. 60/012,794 Mar. 4, 1996.

[51] Int. Cl.⁶ .................................. D01F 1/04; D01F 1/10
[52] U.S. Cl. ........................ 264/13; 264/40.7; 264/78; 264/211
[58] Field of Search .......................... 264/13, 40.7, 78, 264/167, 211

[56] References Cited

U.S. PATENT DOCUMENTS

| | | |
|---|---|---|
| 2,815,532 | 12/1957 | Braunlich . |
| 3,360,497 | 12/1967 | Jones et al. . |
| 3,668,172 | 6/1972 | Jones et al. . |
| 3,701,619 | 10/1972 | Appeldoorn et al. . |
| 3,846,507 | 11/1974 | Thomm et al. ......................... 525/432 |
| 3,856,270 | 12/1974 | Hemker . |
| 3,900,676 | 8/1975 | Alderson . |
| 3,920,595 | 11/1975 | Anderson et al. . |
| 3,968,307 | 7/1976 | Matsui et al. . |
| 4,101,501 | 7/1978 | Hinterwaldner . |
| 4,197,020 | 4/1980 | Doherty, III . |
| 4,268,432 | 5/1981 | Malsen et al. . |
| 4,279,802 | 7/1981 | Laely et al. . |
| 4,341,673 | 7/1982 | Hyde . |
| 4,374,641 | 2/1983 | Burlone . |
| 4,414,276 | 11/1983 | Kiriyama et al. . |
| 4,507,409 | 3/1985 | Jakubowski . |
| 4,639,272 | 1/1987 | Ito et al. . |
| 4,656,206 | 4/1987 | Carter . |
| 4,670,181 | 6/1987 | Mollinger et al. . |
| 4,683,259 | 7/1987 | Goodman . |
| 4,778,704 | 10/1988 | Wells et al. . |
| 4,793,957 | 12/1988 | Lovegrove . |
| 4,952,617 | 8/1990 | Ayala et al. . |
| 4,957,949 | 9/1990 | Kamada et al. . |
| 5,137,369 | 8/1992 | Hodan . |
| 5,162,074 | 11/1992 | Hills . |

(List continued on next page.)

FOREIGN PATENT DOCUMENTS 1201249  8/1970  United Kingdom .

*Primary Examiner*—Leo B. Tentoni
*Attorney, Agent, or Firm*—Nixon & Vanderhye PC

[57] ABSTRACT

Methods of continuously producing sequential lengths of different additive-containing melt-spun filaments include continuously supplying a melt-spinnable polymeric host material to orifices of a spinneret and controllably dosing at least one dispersible additive concentrate system containing a pigment in a liquid nonaqueous polymeric carrier to the melt flow of polymeric host material upstream of the spinneret orifices. In such a manner, a first polymeric mixture of the dispersible additive concentrate system and the polymeric host material is obtained which achieves an additive attribute. During a first time interval, the first mixture is extruded through the spinneret orifices; and thereafter, during a second subsequent time interval, the dosing of the at least one dispersible additive is changed so as to form a second mixture having a second additive attribute different from the first additive attribute while continuously supplying the melt flow of polymeric host material to the spinneret orifices. The melt-spun filaments will thus have a first length corresponding to the first additive attribute of the first mixture and a second subsequent length corresponding to the second additive attribute of the second mixture. The methods and additives employed most preferably achieve Hunter Green Purge Values of between about 0.10 to about 1.40 sec/cm³.

17 Claims, 1 Drawing Sheet

U.S. PATENT DOCUMENTS

| | | |
|---|---|---|
| 5,223,196 | 6/1993 | Sdhridharani et al. . |
| 5,236,645 | 8/1993 | Jones . |
| 5,238,978 | 8/1993 | Stein . |
| 5,290,850 | 3/1994 | Shridharani et al. . |
| 5,318,738 | 6/1994 | Agarwal et al. . |
| 5,320,512 | 6/1994 | Moore, Sr. . |
| 5,354,809 | 10/1994 | Hesse et al. . |
| 5,391,703 | 2/1995 | Lin . |
| 5,401,313 | 3/1995 | Supplee et al. . |
| 5,422,181 | 6/1995 | Hwu et al. . |
| 5,459,195 | 10/1995 | Longhi . |
| 5,516,476 | 5/1996 | Haggard et al. . |
| 5,516,814 | 5/1996 | Trotoir . |
| 5,560,973 | 10/1996 | Hoyt et al. . |
| 5,633,295 | 5/1997 | Higgs . |
| 5,641,570 | 6/1997 | Blackwell . |
| 5,686,515 | 11/1997 | Phillips et al. . |

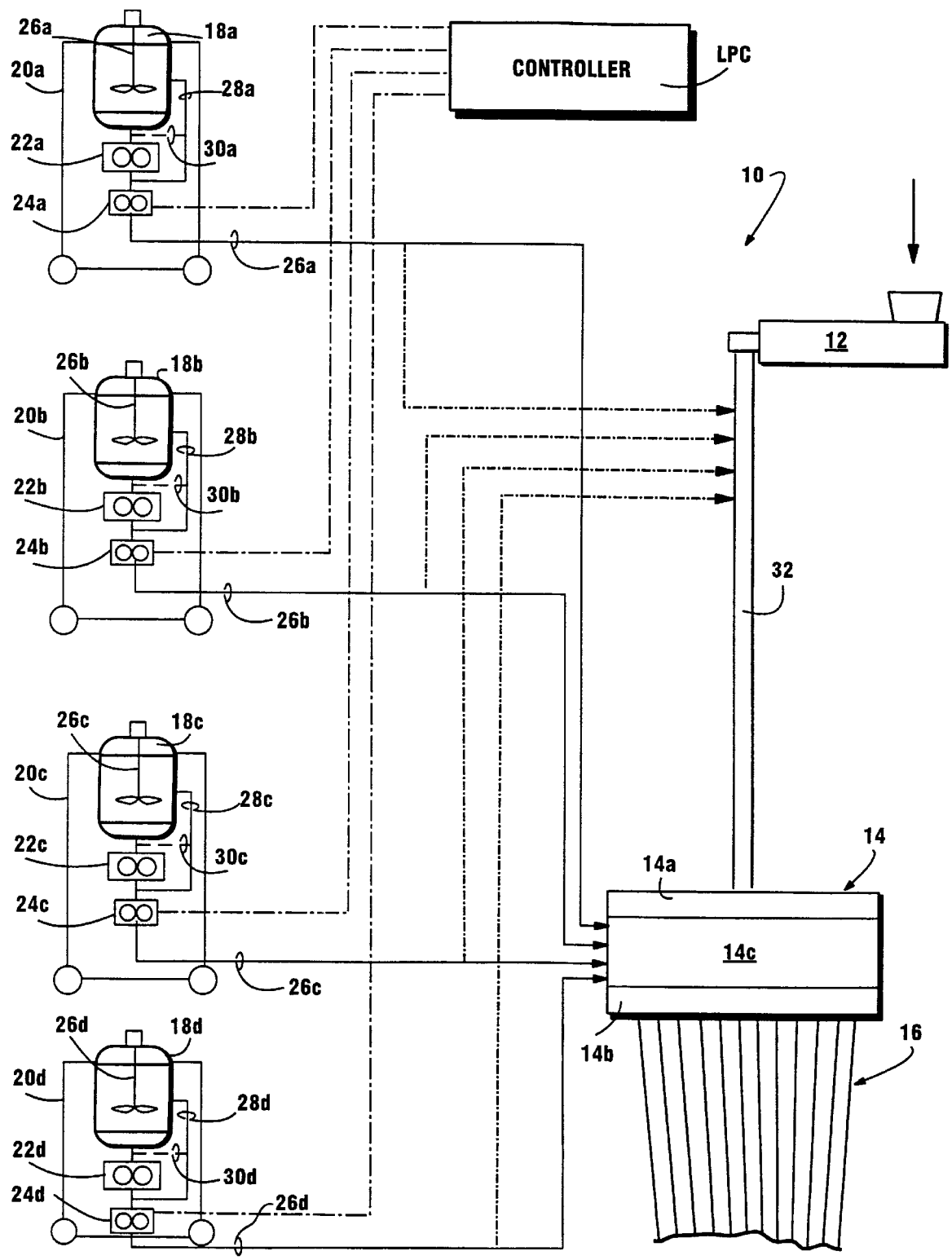

METHODS OF MAKING DIFFERENT ADDITIVE-CONTAINING FILAMENTS

CROSS-REFERENCE TO RELATED APPLICATION

This application is related to, and claims domestic priority benefits under 35 USC§119(e) from, U.S. Provisional application Ser. No. 60/012,794 filed on Mar. 4, 1996, the entire content of which is expressly incorporated hereinto by reference.

FIELD OF INVENTION

The present invention relates generally to the field of thermoplastic polymeric materials containing one or more additives. In preferred exemplary embodiments, the present invention relates to synthetic filament additives (e.g., colorants) and to methods for incorporating such additives in melt flows of filament-forming thermoplastic polymeric materials prior to melt-spinning to form synthetic filaments therefrom.

BACKGROUND AND SUMMARY OF THE INVENTION

The incorporation of additives in so-called "neat" thermoplastic polymeric host materials (that is, polymeric materials containing no additives) so as to achieve desired physical properties is well known. Thus, the art has conventionally incorporated colorants, stabilizers, delusterants, flame retardants, fillers, antimicrobial agents, antistatic agents, optical brighteners, extenders, processing aids and other functional additives into polymeric host materials in an effort to "engineer" desired properties of the resulting additive-containing polymeric host material. Such additives are typically added any time prior to shaping of the polymeric material, for example, by spinning or molding (e.g., extrusion, injection, or blow-molding) operations.

The incorporation of colorant additives in filaments formed by melt-spinning a polymeric material has presented unique challenges. For example, the amount of particulate pigment dispersed in a concentrate which is added to the polymeric material must be sufficiently high to impart satisfactory color density, but must not be so high as to interrupt the spinning process. One prior proposal for incorporating colorant additives in thermoplastic polymeric materials is disclosed in U.S. Pat. No. 5,236,645 to Frank R. Jones on Aug. 17, 1993 (the entire content of which is expressly incorporated hereinto by reference).

According to the Jones '645 patent, additives are introduced into a thermoplastic melt by feeding at least one additive in an aqueous vehicle containing a dispersant to form an aqueous additive stream to a vented extruder which is extruding a thermoplastic. The aqueous portion of the aqueous additive stream is thereby volatilized within the extruder and is removed therefrom via an extruder vent. As a result, a substantially homogeneous system containing the thermoplastic, dispersant and the additive is obtained which may thereafter be spun into a filament by melt-extrusion through filament-forming orifices in a spinneret associated with a spin pack assembly.

Although the techniques disclosed in the Jones '645 patent are entirely satisfactory, some further improvements to incorporating additives in a melt flow of thermoplastic polymeric materials would be desirable. For example, it would especially be desirable if the additive stream was non-aqueous as this would obviate the need for a vented extruder (i.e., since a volatilized aqueous portion of the additive stream would not then need to escape prior to melt-spinning). Furthermore, it is entirely possible that a non-aqueous additive stream could be introduced physically near or into the spin pack assembly where it can be mixed with a melt flow of the polymeric material immediately upstream of the spinneret orifices (and preferably downstream of the polymer filter section of the spin pack assembly) thereby bypassing the extruder. Such a possibility would then allow additive concentration and/or types to be changed on a continuous basis to produce sequential lengths of melt-spun filaments having desired, but different, properties and/or characteristics. That is, the upstream processing equipment, for example, the extruders and process piping, which supply the polymeric host material to the spin pack assembly would not necessarily need to be shut down for purposes of cleaning. Furthermore, by introducing a non-aqueous additive stream directly into the spin pack assembly, the flushing time would be relatively short thereby allowing, for example, quick color changes to occur from one filament production batch to another. It is towards providing such improvements that the present invention is directed.

Broadly, the present invention is embodied in a nonaqueous additive concentrate system for thermoplastic polymeric host materials which may be added directly to a melt flow of the polymeric material in metered amounts. More specifically, the additive concentrate system according to the present invention includes a filament additive which is dispersed in a liquid or liquefied nonaqueous carrier. The filament additive may, during use, be in the form of a solid particulate or a liquid. When a solid particulate is used, the additive system of this invention most preferably also includes a dispersant which coats the particulate additive. The additive concentrate system according to this invention is most preferably in the form of a flowable paste which can be added in metered amounts (dosed) to a melt flow of the polymeric material prior to being spun into filaments, for example near or into the spin pack assembly upstream of the assembly's filament-forming spinneret orifices.

In such a manner, therefore, synthetic filament batches having different additives may be produced sequentially on a continuous basis without costly equipment downtime. That is, the same spin pack assembly may be used to produce a first batch of filaments containing one type of additive during one production interval, and then used to produce a second batch of filaments containing a second type of additive during a succeeding production interval by changing the additive which is introduced into the filament-forming melt. Moreover, the time interval needed to change between different additives is relatively short since the additive system is most preferably introduced into the melt flow near or into the spin pack assembly which in turn reduces significantly the time needed to flush residual additive incorporated into the first batch of filaments. Production of different additive-containing filaments (e.g., filaments containing different colorants) is now possible in a relatively short period of time without stopping filament winding.

Thus, another aspect of this invention involves a method of continuously producing sequential lengths of different additive-containing filaments by continuously supplying a melt-spinnable polymeric host material to orifices of a spinneret and, during a first time interval, controllably dosing a concentrate system having one additive into the polymeric material to form a first polymeric mixture which is extruded through the spinneret orifices. Subsequently, during a second time interval, another concentrate system containing a different additive is controllably dosed into the polymeric material without disrupting the continuous supply of polymeric material to the spinneret orifices to form a second polymeric mixture which is extruded through the spinneret orifices.

During the change of additive concentrate, an intermediate time interval will be needed in order to flush the spinneret of residual amounts of the first additive concentrate. Thus, during the intermediate time intervals, an intermediate length of filaments will be produced which will change over the filament length from containing all of the first additive concentrate to containing all of the second additive concentrate. This intermediate length of filaments produced according to the present invention will be handled separately from the first and second lengths of production filaments. However, the amount of such intermediate length of filaments will be relatively small since, as noted above, the time interval needed to flush the spinneret of residual amounts of the first additive concentrate is relatively short.

Other advantages ensue from introducing the additive concentrate system to the polymeric host material within the spin pack assembly. For example, the spin pack assembly and its associated spinneret orifices may be so designed to form melt-spun multicomponent filaments (e.g., filaments having multiple domains of different polymer blends, colorants and/or other additives) such as those filaments disclosed in U.S. Pat. No. 5,162,074 to Hills (the entire content of which is expressly incorporated hereinto by reference) by splitting a melt-flow of polymeric host material into two or more subflows within the spin pack assembly. According to the present invention, therefore, the additive concentrate system may be introduced into the spin pack assembly and mixed with one or more of such subflows of polymeric host material without being mixed with other subflows so as to form multicomponent filaments. Therefore, while the discussion which follows emphasizes the production of filaments in which the additive concentrate system is substantially homogeneously mixed through the filament cross-section, it will be understood that the present invention is likewise applicable to the formation of multicomponent filaments whereby the additive concentrate system is substantially homogeneously mixed throughout one or more multiple polymeric domains in the filament cross-section without being present in the other domain(s) (e.g., as in core-sheath filaments, pie wedge filaments, side-by-side filaments and the like).

As noted above, significant processing flexibility ensues according to the present invention. Processing flexibility is the result of at least two features of the present invention. First, additive concentrate systems can be mixed above the spinneret with either the entire host polymer or only a portion of the host polymer. For example, a functional additive (e.g., an antistatic agent) concentrate system might be mixed with only a third of the host polymer such that a third of the filaments spun contain the antistatic agent and the remaining two-thirds do not.

Second, two or more additive concentrate systems can be mixed with the host polymer above the spinneret to achieve a single attribute in the fiber that is spun. For example, a yellow additive concentrate system and a blue additive concentrate system can be concurrently mixed with host polymer above the spinneret to provide a green fiber when the mixture is spun. There is no theoretical limit for the number of additive concentrate systems that can be mixed with the host polymer above the spinneret. The number of additive concentrate systems is limited only by the space available to inject the systems into the line. It is contemplated that the host polymer might also contain some additive prior to mixing above the spinneret.

These two features of the present invention are not mutually exclusive and great flexibility ensues from combining them. Using color as an example, either single color or multicolor yarn can be spun using the present invention. Single color yarn may be spun by mixing one or more color additive concentrate systems (e.g., a yellow system and blue system as exemplified above) with the entire host polymer such that a one color yarn (e.g., a multifilamentary yarn containing only green filaments) results.

Multicolor yarn (e.g., heather yarn) may be spun by selectively coloring separated portions of the host polymer and keeping each separated portion segregated until spun. For example, a portion of the host polymer might be colored with both the yellow and the blue additive systems to produce green filaments. Another portion of the host polymer might be colored with a red additive system to produce red filaments which are spun concurrently with the green filaments. The resulting multifilamentary yarn will therefore exhibit a heathered color due to the combination of individual red and green filaments present in the yarn.

The concepts above apply also to the spinning of filaments having multiple cross-sectional domains, such as core-sheath filaments, pie wedge filaments, side-by-side filaments and the like. Thus, for multidomain filaments, the additive concentrate system may be mixed with one or more split flows of the host polymer and then recombined with the remainder of the host polymer flow to achieve filaments having the additive present only in one or more of the cross-sectional domains.

When the additive is a colorant, therefore, a virtually unlimited number of multicolored, multidomain filaments can be produced. For example, only the core of a core-sheath filament may include one or more colorant additives which imparts to the fiber a color attribute that is visibly perceptible through the uncolored sheath. In this regard, it has been found that colorant additive(s) contained only in the core of a core-sheath multidomain filament results in a color intensity that is achieved with reduced colorant loading levels (e.g., between about 5 to about 10% less) as compared to filaments having the same colorant additive(s) homogeneously dispersed throughout the entire filament cross-section to achieve comparable color intensity.

Alternatively or additionally, the colorant additive may be present in the sheath of a core-sheath filament so as to achieve a color effect that is a combination of the core and sheath colors. Thus, by selectively choosing and incorporating colorants into the core and/or sheath, virtually any color attribute can be achieved for the resulting filament. Some particular combinations of colorants in both the core and sheath of a core-sheath filament may not necessarily result in a "pure" color combination of such colorants being realized for the filament. That is, the additive/subtractive effects of colorants in the core and sheath of core-sheath filaments are relatively complex and sometimes cannot be predicted with absolute certainty. However, routine experimentation with colorants in the core and/or sheath of core-sheath filaments will result in virtually an unlimited number of desired filament color attributes being obtained.

Other multiple domain filament combinations are envisioned, such as side-by-side domain filaments having different color attributes in each of the sides or pie wedge filaments whereby one or more of the wedges have the same or different color attributes. Such multiple domain filaments may be usefully employed to form heather yarns since the color additive-containing domains will visually present themselves at different locations along the length of the filaments when twisted (e.g., as may occur during yarn processing). Furthermore, the colorants and domains in which such colorants are present can be selected to achieve filaments which macroscopically appear to be uniformly colored.

Furthermore, although the additive concentrate systems of this invention may be metered (dosed) into the host polymer (whether in its entirety or in one or more of its split flows) at a substantially constant rate, periodic or continual variance of the dose rate is also envisioned. Thus, as noted briefly above, when changing from one filament recipe to another, one or more of the additive concentrates will need to be varied in order to switch filament production from a former recipe to the then current recipe. A random or constant dosage rate variance can also be practiced, however, in which case the resulting filaments will have more or less of the additive distributed along its length. When the additive is a colorant, such a technique allows filaments to be formed having a slub-like color appearance along its axial length which may be employed, for example, to produce yarns having a striated or marbled impression.

These and other aspects and advantages of this invention will become more clear after careful consideration is given to the following detailed description of the preferred exemplary embodiments thereof.

BRIEF DESCRIPTION OF THE ACCOMPANYING DRAWING

Reference will hereinafter be made to the accompanying drawing wherein FIG. 1 is a schematic view of a filament melt-spinning apparatus in which the additive system of this invention may be added to a melt flow of polymeric material prior to spinning.

DETAILED DESCRIPTION OF THE PREFERRED EXEMPLARY EMBODIMENTS

To promote an understanding of the principles of the present invention, descriptions of specific embodiments of the invention follow and specific language describes the same. It will nevertheless be understood that no limitation of the scope of the invention is thereby intended, and that such alterations and further modifications, and such further applications of the principles of the invention as discussed are contemplated as would normally occur to one ordinarily skilled in the art to which the invention pertains.

Thus, for example, while reference has been, and will hereinafter be, made to melt-spinning of filaments, it will be understood that other operations which serve to shape a melt of a polymeric material to a final form (e.g., extrusion or injection molding, blow-molding or the like) are contemplated. Furthermore, for ease of reference, the discussion which follows will emphasize the presently preferred embodiment of the invention in terms of incorporating colorants into polymeric materials, but the present invention can likewise be employed to incorporate virtually any other conventional additive as may be desired. In this regard, the term "pigment" as used herein and in the accompanying claims is meant to refer to virtually any material that may be added physically to a polymer melt flow, and thus generically encompasses colorant pigments which will be emphasized in the discussion which follows. Thus, suitable pigments which may be employed in the practice of this invention include solid and liquid colorants, stabilizers, delusterants, flame retardants, fillers, antimicrobial agents, antistatic agents, optical brighteners, extenders, processing aids and other functional additives.

As used herein and in the accompanying claims, the term "color" includes Munsell Values between about 2.5/ to about 8.5/ and Munsell Chromas greater than about /0.5. (Kelly et al, *The ISCC-NBS Method of Designating Colors and a Dictionary of Color Names,* National Bureau of Standards Circular 553, pp. 1–5 and 16 (1955), incorporated hereinto by reference.)

The host polymer in which the additive concentrate system of this invention may be incorporated includes any synthetic thermoplastic polymer which is melt-spinnable. Exemplary polymers are polyamides such as poly (hexamethylene adipamide), polycaprolactam and polyamides of bis(4-aminocyclohexyl) methane and linear aliphatic dicarboxylic acids containing 9, 10 and 12 carbon atoms; copolyamides; polyester such as poly(ethylene) terephthalic acid and copolymers thereof; polyolefins such as polyethylene and polypropylene; and polyurethanes. Both heterogeneous and homogeneous mixtures of such polymers may also be used.

I. Additive Concentrate Preparation

As noted above, the additive concentrate system employed in the practice of the present invention is a dispersion or solution of pigment in a nonaqueous liquid or liquefied polymeric carrier. The pigment may be a solid particulate (e.g., a colorant) which is coated with a dispersant for physical dispersion in the carrier material. Alternatively, the pigment may be in a form which is soluble with the carrier, in which case the dispersant is not necessarily employed. Thus, the pigment may homogeneously be suspended and/or solubilized in the carrier.

Although a variety of pigments may be employed in the practice of the present invention, it is presently preferred that the pigment is a particulate colorant pigment having a mean particle size of less than 10 $\mu$m, preferably less than about 5 $\mu$m, and most preferably between 0.1 $\mu$m to about 2 $\mu$m.

If present, the preferred dispersants which may be employed in the practice of this invention are the water soluble/dispersible polymers as described in U.S. Pat. No. 3,846,507 (the entire content of which is expressly incorporated hereinto by reference). One particularly useful dispersant in this class is a copolymer of caprolactam/ hexamethylene-diamine/isophthalic acid/sodium salt of sulfoisophthalic acid having a molecular weight of about 7,000, a specific gravity ($H_2O=1$) of about 1.1, a solubility in water of about 25% at 20° C. This preferred water soluble/dispersible polyamide copolymer dispersant is manufactured by BASF Corporation and will hereinafter be referenced as "C-68".

Other useful dispersants that may be employed in the practice of this invention are water soluble/dispersible polyesters. One particularly preferred polyester which is completely dispersible in water is commercially available from Eastman Chemical Products, Inc., Kingsport, Tenn., under the product name "LB-100". This preferred water soluble/ dispersible polyester has a specific gravity ($H_2O=1$) of about 1.08, and is available commercially as a 30% solution of the polyester in water.

Other water soluble/dispersible polymers that may be useful in the practice of the present invention include, but are not limited to other water soluble/dispersible polyamides and copolymers thereof, water soluble/dispersible polyesters and copolymers thereof, water soluble/dispersible vinyl polymers and copolymers thereof, water soluble/dispersible alkylene oxide polymers and copolymers thereof and water soluble/dispersible polyolefins and copolymers thereof, as well as mixtures of the same. Other dispersants, like monomeric dispersants, may be suitable for use with the present invention.

One presently preferred technique for producing the additive dispersion of this invention uses as a starting material the aqueous dispersion formed according to the above-referenced Jones '645 patent. The aqueous dispersion may then be bead-milled and subjected to a spray drying operation so as to remove the aqueous component. The resulting dispersant-coated pigment granules (hereinafter more simply referred to as the "dispersible pigment granules") are in powder form and have an average particle size of greater than about 5 μm. The dispersible pigment granules may then be mixed with a nonaqueous liquid polymeric carrier material. When dispersed into the polymeric host material, the dispersible pigment granules will break apart into average particle sizes of about 1 μm or less. In this way, maximum pigment loadings may be achieved without unduly increasing viscosity of the paste, while at the same time allowing the dispersible pigment granules to readily disperse in the polymeric host material at a size which does not affect adversely the spinning operation.

The carrier material can be virtually any material that is liquid at or below melt-spinning temperatures of the polymeric host material. Preferably, the carrier material is a polyamide or a polyester. The carrier material must also be compatible with the thermoplastic polymeric host material. For example, when providing an additive concentrate system for incorporation into a nylon-6 polymeric host material, the presently preferred carrier is polycaprolactone since it is liquid at room temperatures (20° C.). However, carriers that may be liquefied at elevated temperatures (e.g., less than about 200° C.) are also useable in the practice of this invention. For example, when providing an additive concentrate system for incorporation into a nylon-6 polymeric host material, it is also possible to use copolyamides having a melting point of less than about 200° C. One particularly preferred class of such copolyamides is commercially available under the trade name Vestamelt copolyamides from Hüls America Inc. of Piscataway, N.J., with Vestamelt 722 being particularly preferred.

One alterative technique to make the additive concentrate system according to this invention involves mixing the pigment, carrier and, if present, dispersant to form a nonaqueous paste in a one-step process thereby eliminating the need to prepare an aqueous dispersion which is subsequently spray dried. It is preferred that the dispersant, if present, and the carrier be premixed prior to addition of the pigment. The mixture may then be milled so as to obtain a paste which can be introduced directly into a melt flow of the polymeric host material.

The additive concentrate system of this invention may also be prepared by combining the pigment and the dispersant in a high-intensity mixer (e.g., a Henschel FM series mixer available commercially from Henschel Mixers America, Inc. of Houston, Texas) until they are intimately mixed. Thereafter, the shear imparted by the mixer is reduced, and the required mass of carrier is added to yield the additive concentrate of this invention in paste form.

The dispersants that may be employed in the one-step technique, in addition to those described above, include polyethylene glycol p-octyl phenyl ether (Triton X-100), polyoxypropylene/ethylene block copolymers (Pluronic 25R2), alkoxylated diamines (Tetronic 150R1), sodium lauryl sulfate and cationic dispersants (VariQuat). The dispersant (i.e., the non-carrier material), if present, is present in the additive concentrate system in an amount between about 5 to about 100 wt. % based on the weight of the pigment, and more preferably, between about 40 to about 100 wt. %.

However formed, the additive concentrate system is most preferably in the form of a flowable paste having a viscosity during introduction into the polymeric host material ranging between about 500 cP to about 500,000 cP, and most preferably between about 1,500 cP to about 100,000 cP, at a temperature between about 20° C. to about 200° C. The dispersible additive may be maintained to within an acceptable viscosity range by application of heat (e.g., by keeping the dispersible additive in a suitable storage vessel which is jacketed with electrical resistance heaters and/or a heat transfer medium).

The additive concentrate system preferably contains pigment in an amount between about 5 to about 75 wt. %, more preferably between about 10 to about 65 wt. % based on the weight of the additive concentrate system. The additive concentrate system (the dispersible additive) itself is incorporated into the polymeric host material at levels between about 0.01 to about 15 wt. %, more preferably between about 0.05% and 10.0 wt. % based on the total weight of the polymeric host material and additive concentrate system. When spray dried dispersible pigment granules are employed, they will preferably be present in the paste (that is, the dispersible pigment granules and the carrier material) so as to provide a solids content in the paste of at least about 50 wt. %, and more preferably at least about 57 wt. % or greater.

II. FILAMENT PRODUCTION

Accompanying FIG. 1 schematically depicts a filament spinning operation 10 by which additive concentrate systems may selectively be mixed with a melt flow of polymeric host material discharged from a conventional screw extruder 12 and supplied to an inlet of the spin pack assembly 14. More specifically, the polymeric host material is introduced into the upstream polymer filter section 14a of the spin pack assembly before being extruded through orifices in the spinneret 14b to form additive-containing filaments 16. Prior to reaching the spinneret 14b, the polymeric host material may be distributed by a plurality of thin distribution plates 14c in accordance with the above-noted U.S. Pat. No. 5,162,074 to William H. Hills, which may or may not have one or more static mixing plates, for example, as disclosed in U.S. Pat. No. 5,137,369 to John A. Hodan (the entire content of which is expressly incorporated hereinto by reference).

Batches of the additive concentrate systems in paste form are respectively held within portable tanks 18a–18d. In the accompanying FIG. 1, tanks 18a–18d are shown supported on wheeled carts 20a–20d, respectively, so as to permit each of the tanks 18a–18d to be replaced easily with stand-by tanks containing a fresh supply of the same or different additive concentrate system. However, other means can be employed which allow the tanks 18a–18d to be portable, such as in-ground or overhead conveyance systems, cranes and the like. Preferably, the additive concentrate system contained in each of the tanks 18a–18d is different—that is, tanks 18a–18d may each contain a different pigment or pigment mixture so that selective incorporation of each will result in the desired properties being achieved for the filaments 16.

Specifically, the tanks 18a–18c may each respectively contain dispersible colorant pigments corresponding to selected colors such as aqua, magenta and yellow, while tank 18d may have a specially formulated tint color (e.g., white, black or the like) to achieve the desired color hue, chroma and/or intensity. The differently colored additive concentrates held within the tanks 18a–18d may thus be volumetrically dosed or mixed with the polymeric host material so as to achieve a virtually unlimited number of resulting colors of the melt-spun filaments 16. In a like manner, other filament properties may be "engineered" by selective incorporation of other non-colorant pigments.

The carts 20a–20d also support a primary pump 22a–22d and a metering pump 24a–24d, respectively. The pumps 22a–22d and 24a–24d are most preferably gear-type pumps which serve to force the additive concentrate system paste through respective supply lines 26a–26d to the spin pack assembly 14. More specifically, the primary pumps 22a–22d serve to maintain a relatively constant input pressure to the immediately downstream respective metering pump 24a–24d. The primary pumps 22a–22d are therefore relatively larger capacity as compared to their respective downstream metering pump 24a–24d.

The additive concentrate system paste within each of the tanks 18a–18d is maintained under constant agitation in order to prevent sedimentation of the pigment therein. Such agitation may be accomplished by a motor-driven mixer 26a–26d and/or via recycle lines 28a–28d (and/or lines 30a–30d). Of course, if the pigment is in solution with the carrier, then such agitation may not be needed.

The metering pumps 24a–24d are variable speed so as to achieve variable volumetric outputs within their respective capacity range stated previously. The speed of the metering pumps 24a–24d is most preferably controlled by a logic programmable controller LPC. Specifically, for a given "recipe" (for example, a desired color for the pigmented filaments 16) input into the controller LPC, appropriate outputs will be issued to one or more of the metering pumps 24a–24d to cause them to operate at a speed to achieve a desired volumetric output for their particular dispersible additive. Thus, it will be recognized that for certain desired colors, some but not all of the metering pumps 24a–24d will be supplying paste from their respective tanks 18a–18d to the spin pack assembly 14 and/or may be operated at different speeds to achieve different volumetric outputs. Suffice it to say, that by selectively controlling the operation of the metering pumps 24a–24d and, when operated, their respective speed (and hence their respective volumetric outputs), selective volumetric paste doses can be continuously supplied to the spin pack assembly 14 where the respective additive concentrate systems will be homogeneously mixed with the melt flow of polymeric host material being fed by the extruder 12 via line 32.

The respective speed of one or more of the metering pumps 24a–24d may also be varied continually to thereby respectively vary the volumetric dose of one or more of the colorant systems over time. Such speed (dose) variance will thereby cause more or less additive concentrate system being incorporated into the filament per unit time where results in a filament having varying amounts of the additive per unit length. In the context of color additives, such speed variance may be employed so as to form filaments having a randomly striated or marbled color appearance.

The additive concentrate pastes from lines 26a–26d are most preferably introduced directly into the spin pack assembly 14 at a location corresponding to the distribution/mixing section 14c—that is, at a location downstream of the polymer filter 14a, but upstream of the spinneret 14b. *In this manner, a relatively quick additive change between succes-*

*sive batches of filaments 16 is possible (i.e., to allow for changes in additive recipe to be realized from one filament batch to another). In addition, such an inlet location for the additive concentrates also allows for a wide range of processing flexibility to be achieved. For example, the additive pastes from tanks 18a, 18b, 18c and/or 18d may be* mixed with the entirety of polymeric host material supplied via line 32 so that all of the filaments 16 have the same color. Alternatively, the distribution/mixing section 14c of the spin pack assembly 14 may be so provided to split the flow of polymeric host material with one or more of the additive concentrate pastes being mixed with one or more of such split flows to achieve, for example, multiple differently colored filament groups which may remain segregated to form single color yarns or may be combined to form multicolor yarns, such as in a heather yarn. In addition, several additives may be mixed with the host polymer so that, for example, single color yarns having multiple additive concentrations therein may be produced from the same spinning equipment. Similarly, one or more additive concentrate pastes may be mixed with split flows of polymeric host material within the distribution/mixing section 14c of the spin pack assembly 14 to achieve multifilamentary yarns having differently colored filaments (e.g., as may be desired to produce yarns having a heathered appearance).

Although accompanying FIG. 1 (and the description above) shows the additive concentrate system pastes being preferably introduced into the melt flow of polymeric host material directly into the spin pack assembly 14 at a location between the polymer filter section 14a and the spinneret 14b, it will be understood that the pastes may be incorporated into the melt flow of polymeric host material at any location upstream of the spinneret 14b. Thus, for example, the additive system pastes may be incorporated into the melt flow of polymeric host material by feeding through an injection port associated with the extruder 12 and/or through a port in line 32. Thus, for example, the additive system pastes may be introduced to the polymeric host material at or downstream of the extruder throat, but upstream of the spinneret 14b.

Different batches of colored filaments 16 may thus be produced continuously by simply changing the recipe in the controller LPC and allowing a sufficient time interval to elapse to ensure that any residual amounts of the additive concentrate system pastes associated with the prior recipe have been purged from the spin pack assembly 14. While some off-specification filament will ensue during the change-over to the new recipe, its economic impact is small by comparison to complete shut-down of the spinning operation. Furthermore, since relatively small amounts of the additive concentrate system pastes will residually be present in the spin pack assembly 14 at the time of recipe change-over, only a relatively short time interval is needed to purge the spin pack assembly of the prior additive recipe and begin producing filaments pigmented with the new recipe.

III. EXAMPLES

The following nonlimiting examples will provide a further understanding of this invention.

In this regard, carpet samples formed of filaments colored in accordance with the present invention and filaments colored in accordance with conventional extruder melt-blending techniques were tested according to the following procedures and, where applicable, a subjective rating scale of between 1 to 5 was utilized (5 being the best rating):

Yarn Degradation

Data representative of yarn strength/elongation before and after 100, 200 and 300 hours ultraviolet radiation exposure according to AATCC Test Method 16-1993, Option E.

Colorfastness

Yarn color/visual data after 100, 200 and 300 hours ultraviolet radiation exposure according to AATCC Test Method 16-1993, Option E.

Taber Abrasion Test

ASTM D3884-92.

Crocking

AATCC Test Method 8-1989.

Exposure to 50% Bleach

Carpet samples were cut into two 4.5"×9" squares. 25 ml of a bleach solution containing about 2.6% sodium hypochlorite (50% Clorox® brand bleach and water) was poured into the center of one sample to form a test region approximately 2" in diameter. The sample was allowed to air dry for 24 hours after which it was rinsed with a hot detergent/water solution containing 12 parts water and 1 part detergent. The rinsed sample was air dried for 24 hours after which it was visually rated on a scale of 1 to 5 against the untreated sample using AATCC Gray Scale in a Macbeth light booth (daylight setting).

Visual Grades After Exposure to $NO_2$

AATCC Test Method 164–1992.

Dry Heat Exposure

Samples are heated in a laboratory oven (1600 Watts, Model No. OV-490, Blue M. Electric Co., Blue Island, Ill.) at 280° F. and 320° F. and removed after ten minutes. The samples are allowed to cool and visually rated on a scale of 1 to 5 using AATCC Gray Scale.

Tetrapod Wear

ASTM D5251-92.

Hunter Green Purge Value

The additive concentrate systems of the present invention achieve a Hunter Green Purge Value ("HGPV") of between about 0.10 to about 1.40 sec/cm³, more preferably, between about 0.50 to about 1.40 sec/cm³, and most preferably between about 0.80 to about 1.05 sec/cm³. In this regard, HGPV is the time, in seconds, per unit volume, in cubic centimeters, of the spinning system required for at least 90% of melt-spun Hunter Green nylon-6 filaments to achieve a CIE L* value of about 63 or greater at a system throughput of 217 g/min. Hunter Green nylon-6 polymer employed to determine HGPV was prepared as described in Example 10 below.

EXAMPLE 1

Dispersant-coated pigment particles were prepared using the components noted in Table A below. The components were blended using a high shear dissolver type mixer. A water soluble polyamide dispersant polymer (C-68 manufactured by BASF Corporation in accordance with U.S. Pat. No. 3,846,507 except that poly($\epsilon$-caprolactam) was used as a starting material instead of $\epsilon$-caprolactam) was first dissolved in water to prepare a 25 percent stock solution. Pigment dispersions were then bead-milled with 2 mm glass beads for three passes through the mill and were thereafter spray-dried. The dispersions were spray-dried using a Niro FSD-Pilot unit, which had a 1.5 meter diameter, 0.8 meters cylinder height, 40° cone, and a fluidized bed collector at the bottom of the chamber. Dispersions were fed into the dryer with a two-fluid, externally-mixed nozzle. The spray-dryer was run with 253°–263° C. inlet and 67°–103° C. outlet temperatures. The spray-dried powder tended to be dusty, and thus a fluidized bed collector was used to increase agglomerate size and thereby reduce the dust.

TABLE A

| Pigment | % Pigment in Aqueous Dispersion | % Dispersant in Aqueous Dispersion |
| --- | --- | --- |
| Inorganic Yellow | 32.5 | 13.0 |
| Organic Blue | 20.0 | 15.0 |
| Organic Red | 20.0 | 15.0 |
| Inorganic Tan | 30.0 | 12.0 |
| Organic Green | 25.0 | 12.5 |
| Organic Black | 20.0 | 15.0 |
| White/Stabilizer | 32.5 | 13.0 |

EXAMPLE 2

Example 1 was repeated except that a water-dispersible polyester (LB-100 from Eastman Chemical Products, Inc.) was used as the dispersant polymer in the amounts noted in Table B below. Unlike Example 1 above, all dispersions according to this Example 2 contained 5.0% of a polyoxypropylene-polyoxyethylene block copolymer surfactant (Pluronic® 25R2 surfactant from BASF Corporation). Spray-dried dispersions using LB-100 as the dispersant were not dusty, and were prepared using the Niro spray-dryer which was not equipped with a fluidized bed collector. The Niro spray dryer was run with 220° C. inlet and 80°–95° C. outlet temperatures. These dispersions were fed into a rotary wheel type atomizer running at 18,500 rpm.

TABLE B

| Pigment | % Pigment in Aqueous Dispersion | % Dispersant in Aqueous Dispersion |
| --- | --- | --- |
| Organic Blue | 27.5 | 20.6 |
| Organic Red | 27.5 | 20.6 |
| Inorganic Tan | 32.5 | 13.0 |
| Organic Green | 32.5 | 24.7 |
| Organic Black | 25.0 | 18.7 |
| White | 40.0 | 16.0 |
| White/Stabilizer | 40.0 | 16.0 |

EXAMPLE 3

The additive concentrate pastes in Table C below were prepared by first melting at 150° C. 50–60% of the required copolyamide carrier polymer (Vestamelt 722 from Huls America Inc.). The spray-dried powders obtained according to Example 1 above were then bag-blended in desired ratios to achieve desired final colors and stirred into the molten carrier polymer. The balance of the carrier polymer needed was then added and stirred into the concentrate blend formulation. The spray-dried powders tended to form large agglomerates which did not disperse without extended agitation. Thus, the blends were stirred overnight (approximately 10 to 12 hours) prior to yarn extrusion.

The white/stabilizer pigments used in the blended pigment ratios for all final colors, except Gray and Light Gray, were not the spray dried coated pigments obtained according to Example 1. Instead, the white/stabilizer pigments were compounded with Vestamelt 722 polymer using a vented twin screw compounding extruder to obtain chip concentrates having 25 wt. % of white pigment and 25 wt. % stabilizer. The chip concentrates of such white/stabilizer pigments were then blended in desired ratios with certain of the spray-dried pigments obtained in Example 1 to achieve the final colors noted below in Table C.

TABLE C

| Final Color | Total % Pigment in Paste |
|---|---|
| Light Gray | 13.9 |
| Gray | 9.3 |
| Black | 20.4 |
| Light Green | 20.0 |
| Purple | 25.3 |
| Blue | 19.0 |
| Light Tan | 19.8 |
| Mauve | 18.7 |
| Green | 19.0 |
| Brown | 19.7 |

EXAMPLE 4

The additive concentrate pastes in Table D below were prepared following the procedures of Example 3 above, except that the spray-dried powders obtained from Example 2 were used, and the carrier was polycaprolactone. Unlike Example 3, no compounded chips of white/stabilizer pigments were used.

TABLE D

| Final Color | Total % Pigment in Paste |
|---|---|
| Light Gray | 37.0 |
| Gray | 37.8 |
| Black | 34.0 |
| Light Green | 39.0 |
| Purple | 35.5 |
| Blue | 34.8 |
| Light Tan | 35.0 |
| Mauve | 30.5 |
| Green | 34.9 |
| Brown | 37.7 |

EXAMPLE 5

A Barmag 6E extruder was used for filament yarn extrusion with the additive concentrate pastes in Table C being fed downstream of the extruder at around 150° C. in desired ratios to achieve the filament color noted below in Table E. The resulting melt-spun filament yarns were 6-hole pentagonal cross-section, 715+/−15 denier, and 14 filaments/end. Eight ends of these undrawn yarns were combined during draw texturing to prepare 2250/112 denier yarns which were then two-ply cable-twisted to make 4500/224 denier carpet yarns. The carpet yarns were then tufted into 1/10 gauge, 26 ounces/square yard, 3/16" pile height level loop carpets.

The carpets were then tested to determine various physical properties using the testing methods and techniques described previously. The results of such testing are tabulated below in Tables 1–4 and are presented in comparison to carpets formed of "control" filaments of matching color. The "control" filaments were made using conventional compounded pigment chips which were melt-blended with the polymeric host chip in an extruder, with the melt-blend then being fed to the spinneret.

TABLE E

| Final Color | Additive Concentrate Paste Components Other Than Stabilizer | % Additive Concentrate Paste in Filament |
|---|---|---|
| Light Gray | black, white, green, blue | 1.4 |
| Gray | black, white, blue, red | 2.6 |
| Black | black, white | 3.8 |
| Light Green | black, white, green, tan | 1.4 |
| Purple | black, white, blue, red | 2.6 |
| Blue | black, white, blue, red | 2.8 |
| Light Tan | black, green, tan | 1.7 |
| Mauve | black, blue, red | 2.8 |
| Green | black, green, blue | 4.2 |
| Brown | black, white, red, tan | 6.5 |

TABLE 1

Carpet physical properties after ultraviolet exposure. Test samples made with C-68

| | Yarn Degradation Pounds Break Strength | | | | Colorfastness Visual Ratings (1–5) | | |
|---|---|---|---|---|---|---|---|
| Sample | Original | 100 hours | 200 hours | 300 hours | 100 hours | 200 hours | 300 hours |
| TAN_CTRL_A | 35.5 | 33.8 | 34.4 | 32.5 | 5 | 4–5 | 4–5 |
| TAN_V722 | 34.8 | 34.3 | 32.65 | 33.15 | 5 | 4 | 3–4 |
| LT_GRAY_CTRL_A | 34.3 | 35.1 | 35.3 | 33.62 | 4–5 | 3–4 | 3 |
| LT_GRAY_V722 | 35.9 | 32.4 | 32.85 | 31.7 | 4–5 | 3 | 2–3 |
| LT_GREEN_CTRL_A | 36 | 34.8 | 35.3 | 34.2 | 5 | 4 | 3–4 |
| LT_GREEN_V722 | 33.1 | 33 | 32 | 33.05 | 5 | 4–5 | 4–5 |
| GRAY_CTRL_A | 35.93 | 34.3 | 32.2 | 30.35 | 4–5 | 3–4 | 3–4 |
| GRAY_V722 | 33.3 | 31.9 | 30.15 | 29.85 | 5 | 4 | 3–4 |
| BLACK_CTRL_A | 33.05 | 30.6 | 28.2 | 26.55 | 5 | 5 | 4–5 |
| BLACK_V722 | 31.9 | 30.9 | 30.81 | 31.11 | 5 | 5 | 5 |
| BROWN_CTRL_A | 34.93 | 33.8 | 33.22 | 31.87 | 5 | 5 | 4–5 |
| BROWN_V722 | 31.64 | 31.1 | 30.7 | 31.31 | 5 | 5 | 4–5 |
| GREEN_CTRL_A | 34.48 | 31.7 | 33 | 32.76 | 5 | 5 | 5 |
| GREEN_V722 | 33.7 | 32.3 | 32.33 | 31.72 | 5 | 4–5 | 4–5 |
| BLUE_CTRL_A | 33.96 | 32.5 | 31.55 | 30.68 | 5 | 4–5 | 4–5 |
| BLUE_V722 | 33.6 | 32.3 | 31.2 | 31.8 | 5 | 4–5 | 4–5 |
| PURPLE_CTRL_A | 33.73 | 31.3 | 27.25 | 25.82 | 5 | 5 | 4–5 |
| PURPLE_V722 | 31.98 | 32.2 | 30.38 | 30.28 | 5 | 5 | 4–5 |
| MAUVE_CTRL_A | 33.8 | 33.4 | 30.8 | 28.75 | 5 | 5 | 4–5 |
| MAUVE_V722 | 32.2 | 30.9 | 29.9 | 27.35 | 5 | 5 | 4–5 |

TABLE 2

Carpet visual ratings after Taber wear,
crock testing, and bleach exposure. Test samples made with C-68

| | Taber Abrasion Test Grams Weight Loss After: | | Crocking | | Exposure |
|---|---|---|---|---|---|
| | 1000 cycles | 2000 cycles | Dry | Wet | to 50% Bleach |
| TAN_CTRL_A | 0.077 | 0.122 | 5 | 5 | 4 |
| TAN_V722 | 0.0592 | 0.1069 | 5 | 5 | 4–5 |
| LT_GRAY_CTRL_A | 0.0841 | 0.1179 | 5 | 5 | 4–5 |
| LT_GRAY_V722 | 0.0303 | 0.0587 | 5 | 5 | 3–4 |
| LT_GREEN_CTRL_A | 0.0793 | 0.1138 | 5 | 5 | 4–5 |
| LT_GREEN_V722 | 0.0666 | 0.0987 | 5 | 5 | 5 |
| GRAY_CTRL_A | 0.0448 | 0.0845 | 5 | 5 | 4–5 |
| GRAY_V722 | 0.0792 | 0.1312 | 5 | 5 | 4–5 |
| BLACK_CTRL_A | 0.0594 | 0.0847 | 5 | 5 | 5 |
| BLACK_V722 | 0.05 | 0.0968 | 5 | 5 | 4–5 |
| BROWN_CTRL_A | 0.0461 | 0.0853 | 5 | 5 | 4–5 |
| BROWN_V722 | 0.0578 | 0.1013 | 5 | 5 | 4–5 |
| GREEN_CTRL_A | 0.0513 | 0.0963 | 5 | 5 | 4–5 |
| GREEN_V722 | 0.0713 | 0.1153 | 5 | 5 | 4–5 |
| BLUE_CTRL_A | 0.0797 | 0.1213 | 5 | 5 | 4 |
| BLUE_V722 | 0.077 | 0.1139 | 5 | 5 | 4–5 |
| PURPLE_CTRL_A | 0.0616 | 0.0998 | 5 | 5 | 5 |
| PURPLE_V722 | 0.0957 | 0.14 | 5 | 5 | 4–5 |
| MAUVE_CTRL_A | 0.0263 | 0.0471 | 5 | 5 | 4–5 |
| MAUVE_V722 | 0.0392 | 0.0879 | 5 | 5 | 4–5 |

TABLE 3

Carpet visual ratings after ozone and
nitrogen oxides exposure. Test samples made with C-68

| | Visual Grades After Exposure to Ozone | | Visual Grades After Exposure to NO2 | |
|---|---|---|---|---|
| | 3 cycles | 8 cycles | 3 cycles | 8 cycles |
| TAN_CTRL | 4–5 | 4–5 | 4–5 | 4–5 |
| TAN_V722 | 4–5 | 4–5 | 4–5 | 4 |
| LT_GRAY_CTRL | 4–5 | 4 | 3–4 | 3 |
| LT_GRAY_V722 | 4–5 | 4 | 3–4 | 3 |
| LT_GREEN_CTRL | 5 | 5 | 4–5 | 4 |
| LT_GREEN_V722 | 5 | 4–5 | 4–5 | 4 |
| GRAY_CTRL | 4–5 | 4–5 | 5 | 4–5 |
| GRAY_V722 | 4–5 | 4 | 4–5 | 3–4 |
| BLACK_CTRL | 5 | 4–5 | 5 | 5 |
| BLACK_V722 | 5 | 4–5 | 5 | 5 |
| BROWN_CTRL | 5 | 4–5 | 5 | 4–5 |
| BROWN_V722 | 5 | 4–5 | 5 | 4–5 |
| GREEN_CTRL | 5 | 5 | 5 | 4–5 |
| GREEN_V722 | 5 | 5 | 4–5 | 4–5 |
| BLUE_CTRL | 5 | 4–5 | 4–5 | 4 |
| BLUE_V722 | 5 | 4–5 | 4–5 | 4–5 |
| PURPLE_CTRL | 5 | 4–5 | 5 | 4–5 |
| PURPLE_V722 | 5 | 5 | 5 | 5 |
| MAUVE_CTRL | 5 | 4–5 | 5 | 5 |
| MAUVE_V722 | 5 | 5 | 5 | 4–5 |

TABLE 4

Carpet visual ratings after exposure to dry heat and
Tetrapod wear. Test samples made with C-68

| | Dry Heat Exposure | | 500K in Tetrapod | |
|---|---|---|---|---|
| | 280° F. | 320° F. | Stair | End |
| TAN_CTRL_A | 5 | 4–5 | 4 | 4 |
| TAN_V722 | 5 | 4–5 | 3 | 3–4 |
| LT_GRAY_CTRL_A | 4–5 | 4 | 3–4 | 3–4 |
| LT_GRAY_V722 | 4 | 3 | 3–4 | 4 |
| LT_GREEN_CTRL_A | 4–5 | 4 | 3–4 | 3–4 |
| LT_GREEN_V722 | 4–5 | 4 | 3 | 3–4 |
| GRAY_CTRL_A | 5 | 4–5 | 4 | 4 |
| GRAY_V722 | 4–5 | 3–4 | 3 | 3–4 |
| BLACK_CTRL_A | 5 | 4–5 | 4 | 4–5 |
| BLACK_V722 | 5 | 5 | 4 | 4 |
| BROWN_CTRL_A | 5 | 4–5 | 3–4 | 4 |
| BROWN_V722 | 5 | 4–5 | 4 | 4 |
| GREEN_CTRL_A | 5 | 4–5 | 2–3 | 3–4 |
| GREEN_V722 | 5 | 4–5 | 2 | 3 |
| BLUE_CTRL_A | 5 | 4–5 | 3–4 | 4 |
| BLUE_V722 | 5 | 4–5 | 3 | 3–4 |
| PURPLE_CTRL_A | 5 | 4–5 | 3–4 | 4 |
| PURPLE_V722 | 5 | 4–5 | 3–4 | 3–4 |
| MAUVE_CTRL_A | 5 | 4–5 | 4 | 4 |
| MAUVE_V722 | 5 | 4–5 | 3–4 | 4 |

EXAMPLE 6

Example 5 was repeated except that the additive concentrate pastes of Table D were fed at the extruder throat at ambient temperature (about 20° C.). The paste components and the amount of paste in the filaments are noted below in Table F. The resulting filaments were formed into carpets and tested similar to Example 5. The results appear in Tables 5–8 below.

TABLE F

| Final Color | Additive Concentrate Paste Components Other Than Stabilizer | % Additive Concentrate Paste in Filament |
|---|---|---|
| Light Gray | black, white, green, blue | 0.6 |
| Gray | black, white, blue, red | 0.7 |
| Black | black, white | 2.2 |
| Light Green | black, white, green, tan | 0.8 |
| Purple | black, white, blue, red | 2.0 |
| Blue | black, white, blue, red | 1.6 |
| Light Tan | black, green, tan | 1.0 |
| Mauve | black, blue, red | 1.9 |
| Green | black, green, blue | 2.2 |
| Brown | black, white, red, tan | 3.6 |

TABLE 7

Carpet visual ratings after ozone and nitrogen oxides exposure. Test samples made with LB-100

| | Visual Grades After Exposure to Ozone | | Visual Grades After Exposure to NO2 | |
|---|---|---|---|---|
| | 3 cycles | 8 cycles | 3 cycles | 8 cycles |
| TAN_CTRL_B | 4–5 | 4 | 4–5 | 4 |
| TAN_PCL | 4–5 | 4–5 | 4–5 | 4–5 |
| LT_GRAY_CTRL_B | 4–5 | 4 | 4 | 3 |
| LT_GRAY_PCL | 4 | 3–4 | 4 | 3–4 |
| LT_GREEN_CTRL_B | 4–5 | 4–5 | 4 | 4 |
| LT_GREEN_PCL | 4–5 | 4–5 | 4–5 | 4–5 |
| GRAY_CTRL_B | 4–5 | 4–5 | 4 | 4 |

TABLE 5

Carpet physical properties after ultraviolet exposure. Test samples made with LB-100

| | Yarn Degradation Pounds Break Strength | | | | Colorfastness Visual Ratings (1–5) | | |
|---|---|---|---|---|---|---|---|
| Sample | Original | 100 hours | 200 hours | 300 hours | 100 hours | 200 hours | 300 hours |
| TAN_CTRL_B | 36.06 | 36 | 35.2 | 32.85 | 5 | 4–5 | 4–5 |
| TAN_PCL | 35.08 | 34.45 | 35 | 33.4 | 5 | 4–5 | 4–5 |
| LT_GRAY_CTRL_B | 36.13 | 35.98 | 35.8 | 34.8 | 3 | 2–3 | 2–3 |
| LT_GRAY_PCL | 35.97 | 35.95 | 34.35 | 33.95 | 3–4 | 2–3 | 2–3 |
| LT_GREEN_CTRL_B | 36.7 | 36.15 | 35.1 | 32.85 | 4–5 | 4 | 3 |
| LT_GREEN_PCL | 35.93 | 35.01 | 34.05 | 32.95 | 5 | 4–5 | 4 |
| GRAY_CTRL_B | 36.43 | 36.03 | 35.1 | 35.2 | 5 | 5 | 4–5 |
| GRAY_PCL | 35.95 | 34.71 | 32.25 | 31.2 | 5 | 4 | 4 |
| BLACK_CTRL_B | 32.56 | 30 | 28.21 | 22.96 | 5 | 4–5 | 4–5 |
| BLACK_PCL | 31.25 | 30.85 | 30.9 | 28.08 | 5 | 4–5 | 4–5 |
| GREEN_CTRL_B | 33.15 | 32.05 | 31.6 | 29.8 | 5 | 4–5 | 4–5 |
| GREEN_PCL | 32.83 | 32.41 | 32.5 | 30.45 | 5 | 4–5 | 4–5 |
| BLUE_CTRL_B | 34.5 | 32.8 | 31.67 | 29.5 | 4–5 | 4–5 | 4 |
| BLUE_PCL | 34.78 | 33.7 | 34.21 | 32.35 | 5 | 4–5 | 4–5 |
| PURPLE_CTRL_B | 33.52 | 32.33 | 27.95 | 24.1 | 5 | 4–5 | 4 |
| PURPLE_PCL | 33.68 | 32.55 | 32.25 | 29.25 | 4–5 | 4–5 | 4 |

TABLE 6

Carpet visual ratings after Taber wear, crock testing, and bleach exposure. Test samples made with LB-100

| | Taber Abrasion Test Grams Weight Loss After: | | Crocking | | Exposure |
|---|---|---|---|---|---|
| | 1000 cycles | 2000 cycles | Dry | Wet | to 50% Bleach |
| TAN_CTRL_B | 0.033 | 0.0661 | 5 | 5 | 5 |
| TAN_PCL | 0.0252 | 0.0487 | 5 | 5 | 4–5 |
| LT_GRAY_CTRL_B | 0.0365 | 0.0664 | 5 | 5 | 3–4 |
| LT_GRAY_PCL | 0.0018 | 0.0234 | 5 | 5 | 3–4 |
| LT_GREEN_CTRL_B | 0.0186 | 0.0394 | 5 | 5 | 4–5 |
| LT_GREEN_PCL | 0.013 | 0.0426 | 5 | 5 | 5 |
| GRAY_CTRL_B | 0.0427 | 0.0529 | 5 | 5 | 4–5 |
| GRAY_PCL | 0.0297 | 0.0608 | 5 | 5 | 4 |
| BLACK_CTRL_B | 0.0905 | 0.1216 | 5 | 5 | 4–5 |
| BLACK_PCL | 0.1323 | 0.1898 | 5 | 5 | 4–5 |
| GREEN_CTRL_B | 0.0561 | 0.0874 | 5 | 5 | 4–5 |
| GREEN_PCL | 0.0392 | 0.0668 | 5 | 5 | 4–5 |
| BLUE_CTRL_B | 0.065 | 0.0987 | 5 | 5 | 4–5 |
| BLUE_PCL | 0.0693 | 0.1297 | 5 | 5 | 4–5 |
| PURPLE_CTRL_B | 0.0719 | 0.1082 | 5 | 5 | 4 |
| PURPLE_PCL | 0.0887 | 0.1289 | 5 | 5 | 4 |

TABLE 7-continued

Carpet visual ratings after ozone and
nitrogen oxides exposure. Test samples made with LB-100

|  | Visual Grades After Exposure to Ozone | | Visual Grades After Exposure to NO2 | |
| --- | --- | --- | --- | --- |
|  | 3 cycles | 8 cycles | 3 cycles | 8 cycles |
| GRAY_PCL | 4–5 | 4–5 | 4–5 | 4–5 |
| BLACK_CTRL_B | 5 | 4–5 | 5 | 4–5 |
| BLACK_PCL | 5 | 4–5 | 5 | 4–5 |
| GREEN_CTRL_B | 5 | 4–5 | 5 | 4–5 |
| GREEN_PCL | 4–5 | 4 | 5 | 4 |
| BLUE_CTRL_B | 4–5 | 4 | 4–5 | 4 |
| BLUE_PCL | 4–5 | 4 | 4–5 | 4–5 |
| PURPLE_CTRL_B | 4–5 | 4 | 4–5 | 4 |
| PURPLE_PCL | 4–5 | 4 | 4–5 | 4 |

TABLE 8

Carpet visual ratings after exposure to dry heat and Tetrapod wear.
Test Samples made with LB-100

|  | Dry Heat Exposure | | 500 K in Tetrapod | |
| --- | --- | --- | --- | --- |
|  | 280° F. | 320° F. | Stair | End |
| TAN_CTRL_B | 4–5 | 4 | 3 | 3 |
| TAN_PCL | 4–5 | 4 | 3 | 3 |
| LT_GRAY_CTRL_B | 4–5 | 3 | 3 | 3 |
| LT_GRAY_PCL | 4–5 | 3 | 3 | 3 |
| LT_GREEN_CTRL_B | 4–5 | 3–4 | 3 | 3 |
| LT_GREEN_PCL | 4–5 | 4 | 3 | 3 |
| GRAY_CTRL_B | 4–5 | 4 | 3 | 3 |
| GRAY_PCL | 4–5 | 4 | 3 | 3 |
| BLACK_CTRL_B | 5 | 5 | 3–4 | 4 |
| BLACK_PCL | 5 | 5 | 3–4 | 3–4 |
| GREEN_CTRL_B | 5 | 4–5 | 2–3 | 3–4 |
| GREEN_PCL | 5 | 4–5 | 3–4 | 3–4 |
| BLUE_CTRL_B | 5 | 4–5 | 3–4 | 3–4 |
| BLUE_PCL | 4–5 | 4 | 3–4 | 3–4 |
| PURPLE_CTRL_B | 4–5 | 4 | 3–4 | 3–4 |
| PURPLE_PCL | 4–5 | 4 | 3–4 | 3–4 |

The data in Tables 1–8 above demonstrate that the performance properties of carpet yarns made from pigmented filaments of this invention are comparable to carpet yarns which are colored according to the conventional practice of melt-blending pigmented chips with base polymer chips. It is surprising that the incorporation of the low molecular-weight polymer as the carrier in the dispersible additive did not affect either the breaking strength or elongation of the pigmented filaments of this invention when compared to conventional melt-colored filaments.

EXAMPLE 7

A tan additive concentrate paste was formed by direct blending of 40 wt. % tan pigment particles, 8 wt. % of polyethylene glycol p-octyl phenyl ether (Triton X-100) dispersant, and 52 wt. % polycaprolactone. The resulting additive concentrate paste was preheated to approximately 140° C. and exhibited a viscosity of between 2000 to 4000 cP. The paste was pumped directly into a spin pack assembly at a location downstream of the polymer filter but upstream of the spinneret orifices (58 hole asymmetrical trilobal). The additive concentrate paste was mixed with the nylon-6 polymeric host material within the spin pack assembly at a rate of between about 6.0 g/min (to obtain about 0.8–1.1 wt. % pigment in the resulting melt-spun filaments) to about 7.3 g/min (to obtain about 1.1–1.5 wt. % pigment in the resulting melt-spun filaments). The resulting melt-spun filaments had a uniformly colored appearance along the lengthwise extent as viewed with an unaided eye. Microscopic views of filament cross-sections revealed that substantially homogenous to somewhat striated mixing had occurred in dependence upon the injection rate of the additive paste.

EXAMPLE 8

Example 2 was repeated to produce the dispersible additives noted in Table F below:

TABLE F

| Pigment | % Pigment in Aqueous Dispersion | % Dispersant in Aqueous Dispersion |
| --- | --- | --- |
| Anatase TiO$_2$ | 37.5 | 15.0 |
| Red 149 | 27.5 | 20.6 |
| Green 7 | 27.5 | 20.6 |
| Black 6 | 25.0 | 18.7 |
| Blue 15 | 27.5 | 20.6 |
| Brown 11 | 32.5 | 13.0 |
| Red 101 | 20.0 | 13.0 |
| Red 179 | 35.0 | 17.5 |
| Violet 29 | 20.0 | 12.0 |
| Red 101 | 30.0 | 11.2 |
| Brown 24 | 32.5 | 13.0 |
| Blue 60 | 25.0 | 12.5 |
| Red 202 | 27.5 | 20.6 |

The additive concentrate pastes in Table G below were prepared following the procedures of Example 3 above, except that the spray-dried powders of Table F above were used, and the carrier was polycaprolactone.

TABLE G

| Pigment | % Spray Dried Powder in Paste |
| --- | --- |
| Anatase TiO$_2$ | 57.21 |
| Red 149 | 57.44 |
| Green 7 | 57.44 |
| Black 6 | 57.44 |
| Blue 15 | 57.44 |
| Brown 11 | 57.21 |
| Red 101 | 57.21 |
| Red 179 | 52.50 |
| Violet 29 | 57.44 |
| Red 101 | 57.21 |
| Brown 24 | 57.21 |
| Blue 60 | 57.21 |
| Red 202 | 57.21 |

EXAMPLE 9

In order to investigate the effectiveness of employing spray-dried additive powders in accordance with the present invention, an aqueous C.I. pigment black 6 dispersion using LB-100 as the dispersant was ball-milled in a Chicago Boiler five-liter horizontal Dyno-Mill loaded with 4.25 liters of 1.0–1.3 mm glass beads and running at 1705 rpm. The aqueous dispersion was spray-dried in a Niro Utility Spray Dryer having a rotary atomizer running at 24,350 rpm. The inlet air temperature was 220° C. at about 220 cfm. The dispersion feed rate was adjusted to achieve a discharge air temperature of 90° C. The resulting spray dried dispersible pigment particles were then blended with polycaprolactone as the carrier to form a paste such that 20 wt. % of the black pigment was present in the resulting paste. The viscosity (centipoise) of the paste was then investigated as a function of shear rate (sec$^{-1}$) with the results being present in Table H (the "Spray Dry/Disperse" sample).

By way of comparison, 20 wt. % of the same black pigment (C.I. pigment black 6) was dispersed directly in polycaprolactone carrier without the benefit of being spray dried with LB-100 dispersant. The viscosity (centipoise) of the dispersion was also investigated as a function of shear rate (sec$^{-1}$) with the results being present in Table H below (the "Direct Disperse" sample).

TABLE H

| Spray Dry/Disperse | | Direct Disperse | |
|---|---|---|---|
| Shear Rate (sec$^{-1}$) | Viscosity (cps) | Shear Rate (sec$^{-1}$) | Viscosity (cps) |
| 1.4 | 8148 | 0.6 | 50130 |
| 2.4 | 5729 | 1.2 | 31290 |
| 4.2 | 4303 | 3.0 | 14940 |
| 7.3 | 3466 | 6.0 | 11440 |
| 12.6 | 2744 | 12.0 | 6291 |
| 21.8 | 2385 | 24.0 | 4825 |

The data above demonstrate that, at the same pigment loadings in the dispersions, significantly lower viscosities ensue at the same shear rates for spray-dried pigments. Thus, at comparable shear rate, greater pigment loadings are possible for the spray-dried pigments without adversely affecting processing conditions. As a result, therefore, the dispersible additive pastes of this invention which include spray-dried pigments can be incorporated into the host polymeric materials in lesser amounts as compared to direct dispersed pigments in order to achieve comparable pigment properties.

EXAMPLE 10—Hunter Green Purge Values

Green 7, Black 6, Blue 15 and White (anatase TiO$_2$) pastes were prepared according to Example 8, above. Specifically, batches of 200 pounds of each paste were prepared using a mixing profile which began with 30 seconds at a tip speed of 10 m/sec, followed by 3 minutes at 20 m/sec, followed by a discharge period of 45 seconds at 6–8 m/sec.

A copper stabilizer paste was also prepared by charging the mixer with 125 pounds of copper stabilizer and 125 pounds of polycaprolactone. The mixing profile for the copper stabilizer paste began with 10 m/sec tip speed for 2 minutes followed by 10 minutes at 40 m/sec. The copper stabilizer paste was allowed to cool to 125° F. by dropping the mixer tip speed to 10 m/sec and circulation of cooling water through the mixer jacket. After the temperature had dropped, the copper stabilizer paste was discharged at 6–8 m/sec tip speed.

Hunter Green color pastes were prepared by charging the following components and polycaprolactone liquid polymer into a Henschel FM-200 high intensity mixer (all percentages being the weight percent of the components in the paste blend):

(1) Copper Stabilizer Paste: 0.5–1.0 wt. %
(2) Green 7 Paste: 50–60 wt. %
(3) Black 6 Paste: 5–10 wt. %
(4) Blue 15 Paste: 10–15 wt. %
(5) White (anatase TiO$_2$) Paste: Balance to bring Hunter Green paste blend to 100 wt. %

In order to determine the HGPV, the Hunter Green paste is injected into the host polymer (e.g., nylon 6) at 2.7 wt. % to achieve Hunter Green filaments. Injection of the Hunter Green paste is stopped and the time in seconds per unit spinning system volume, in cubic centimeters, is determined when at least 90% of the filaments achieve a CIE L* value of 63 or greater at a system throughput of 217 g/min.

What is claimed is:

1. A method of continuously producing sequential lengths of different additive-containing melt-spun filaments comprising the steps of:

(i) continuously supplying a melt-spinnable polymeric host material to orifices of a spinneret;

(ii) controllably dosing at least one dispersible additive comprised of a pigment in a liquid nonaqueous polymeric carrier to the melt flow of polymeric host material upstream of the spinneret orifices to obtain a first polymeric mixture of the dispersible additive and the polymeric host material to achieve an additive attribute;

(iii) during a first time interval, extruding the first mixture through the spinneret orifices; and then (iv) during a second subsequent time interval, changing the dosing of said at least one dispersible additive so as to form a second mixture having a second additive attribute different from the first additive attribute while continuously supplying the melt flow of polymeric host material to the spinneret orifices so as to extrude the second mixture through the spinneret orifices, whereby the melt-spun filaments have a first length corresponding to the first additive attribute of the first mixture and a second subsequent length corresponding to the second additive attribute of the second mixture are produced continuously.

2. The method of claim 1, wherein at least two dispersible additives are provided, and wherein step (ii) includes controllably dosing the melt flow of polymeric material with both of said dispersible additives to obtain the first additive attribute of the first mixture.

3. The method of claim 1, wherein step (iv) includes changing the dosing amount of at least one of the dispersible additives.

4. A method of continuously producing sequential lengths of differently colored melt-spun filaments comprising the steps of:

(i) continuously supplying a melt-spinnable polymeric host material to orifices of a spinneret;

(ii) controllably dosing at least one dispersible additive comprised of a dispersant-coated pigment particle dispersed in a liquid nonaqueous polymeric carrier to the melt flow of polymeric host material upstream of the spinneret orifices to obtain a first mixture of the dispersible additive and the polymeric host material having a first color attribute;

(iii) during a first time interval, extruding the first mixture through the spinneret orifices; and then (iv) during a second subsequent time interval, changing the dosing of said at least one dispersible additive so as to form a second mixture having a second color attribute different from the first color attribute while continuing to supply the melt flow of polymeric material to the spinneret orifices so as to extrude the second mixture through the spinneret orifices, whereby the melt-spun filaments have a first length corresponding to the first color attribute of the first mixture and a second subsequent length corresponding to the second color attribute of the second mixture.

5. The method of claim 4, wherein at least two dispersible additives are provided, and wherein step (ii) includes controllably dosing the melt flow of polymeric material with both of said dispersible additives to obtain the first color attribute of the first mixture.

6. The method of claim 5, wherein step (iv) includes changing the dosing amount of at least one of the dispersible additives.

7. The method of claim 4, wherein step (i) is practiced by continuously supplying the polymeric host material to an inlet of a polymer filter section of a spin pack assembly, and wherein step (ii) is practiced by introducing said at least one additive into the spin pack assembly downstream of the polymer filter section and upstream of the spinneret orifices so that at least one additive is mixed with at least a portion of said polymeric host material within the spin pack assembly to form said first mixture having said first color attribute which is extruded through at least some of the spinneret orifices.

8. The method as in claim 1 or 4, wherein said polymeric host material is selected from the group consisting of polymers, copolymers and mixtures of polyamides, polyesters, polyolefins and polyurethanes.

9. The method as in claim 8, wherein the polymeric host material is nylon-6.

10. A method of continuously and sequentially producing different additive containing melt-spun filaments comprising:

(i) incorporating at least one dispersible additive into a polymeric host material to form a fiber spinnable first mixture having a first attribute;

(ii) extruding the first mixture through spinneret orifices to form pigmented first filaments thereof; and thereafter (iii) incorporating at least one dispersible additive into said polymeric host material to form a fiber spinnable second mixture having a second attribute and extruding the second mixture through the spinneret orifices to form pigmented second filaments thereof, wherein (iv) steps (i)–(iii) are practiced so as to achieve Hunter Green Purge Values of between about 0.10 to about 1.40 $sec/cm^3$.

11. The method of claim 10, wherein steps (i)–(iii) are practiced so as to achieve Hunter Green Purge Values of between about 0.50 to about 1.40 $sec/cm^3$.

12. The method of claim 10, wherein steps (i)–(iii) are practiced so as to achieve Hunter Green Purge Values of between about 0.80 to about 1.05 $sec/cm^3$.

13. The method of claim 1, 4, or 10, wherein the at least one dispersible additive includes dispersant-coated pigments dispersed in a nonaqueous polymeric carrier.

14. The method of claim 13, comprising prior to step (i), the steps of (a) forming an aqueous dispersion comprised of a pigment and a dispersant, (b) spray-drying the aqueous dispersion so as to obtain the dispersant-coated pigments, and thereafter (c) blending the spray-dried dispersant-coated pigments with the nonaqueous polymeric carrier.

15. The method of claim 13, wherein the at least one dispersible additive has at least about 50% by weight solids.

16. The method of claim 15, wherein the at least one dispersible additive has at least about 57% by weight solids.

17. The method of claim 13, wherein the dispersant-coated pigments are spray-dried.

* * * * *